(12) United States Patent
Venier

(10) Patent No.: US 12,386,950 B2
(45) Date of Patent: Aug. 12, 2025

(54) DETECTION OF UNAUTHORIZED DATA ENCRYPTION

(71) Applicant: HEWLETT PACKARD ENTERPRISE DEVELOPMENT LP, Houston, TX (US)

(72) Inventor: Federico Venier, Ft. Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 435 days.

(21) Appl. No.: 17/815,596

(22) Filed: Jul. 28, 2022

(65) Prior Publication Data

US 2024/0037223 A1 Feb. 1, 2024

(51) Int. Cl.
G06F 21/55 (2013.01)
G06F 21/62 (2013.01)
G06F 21/78 (2013.01)

(52) U.S. Cl.
CPC .......... *G06F 21/55* (2013.01); *G06F 21/6209* (2013.01); *G06F 21/78* (2013.01)

(58) Field of Classification Search
CPC ...... G06F 21/55; G06F 21/6209; G06F 21/62; G06F 21/78; G06F 21/56; G06F 21/564; G06F 21/567; G06F 21/60; G06F 21/6218; G06F 21/6236
See application file for complete search history.

(56) References Cited

U.S. PATENT DOCUMENTS

| 10,229,269 | B1 | 3/2019 | Patton et al. | |
|---|---|---|---|---|
| 10,671,724 | B2 | 6/2020 | Boutnaru | |
| 10,706,167 | B1* | 7/2020 | Sokolov | G06F 21/6218 |
| 11,030,314 | B2 | 6/2021 | Kucherov et al. | |
| 11,036,677 | B1* | 6/2021 | Grunwald | G06F 16/183 |
| 11,190,540 | B2 | 11/2021 | Hittel et al. | |
| 12,143,407 | B2* | 11/2024 | Annen | G06F 11/1484 |
| 2012/0209811 | A1* | 8/2012 | Desai | G06F 11/1448 707/645 |
| 2012/0254982 | A1* | 10/2012 | Sallam | G06F 21/566 726/16 |
| 2013/0276122 | A1* | 10/2013 | Sowder | H04L 7/00 726/24 |
| 2017/0364681 | A1* | 12/2017 | Roguine | G06F 21/554 |

(Continued)

OTHER PUBLICATIONS

Fernando et al., "A Study on the Evolution of Ransomware Detection Using Machine Learning and Deep Learning Techniques", MDPI, Dec. 15, 2020, 54 pages.

(Continued)

*Primary Examiner* — Kostas J Katsikis

(74) *Attorney, Agent, or Firm* — Trop, Pruner & Hu, P.C.

(57) ABSTRACT

In some examples, a system provides access, to a first server, a copy of a volume of data associated with a second server, where the first server is protected against unauthorized access. The first server receives first signatures generated by an agent in the second server based on applying a function on data objects of the volume. The first server generates, at the, second signatures derived based on applying the function on data objects of the copy of the volume. The first server determines whether malware that performs unauthorized data encryption of data of the second server is present, based on comparing the second signatures to the first signatures.

15 Claims, 5 Drawing Sheets

(56) References Cited

U.S. PATENT DOCUMENTS

2022/0350887 A1* 11/2022 Kahn .................... G06F 21/561
2023/0418943 A1* 12/2023 Han ...................... G06N 20/00

OTHER PUBLICATIONS

Wikipedia, "VMDK", available online at <https://en.wikipedia.org/w/index.php?title=VMDK&oldid=1074529020>, Feb. 28, 2022, 3 pages.

Wikipedia, "VMware ESXi", available online at <https://en.wikipedia.org/w/index.php?title=VMware_ESXi&oldid=1092802868>, Jun. 12, 2022, 10 pages.

Wikipedia, "VMware VMFS", available online at <https://en.wikipedia.org/w/index.php?title=VMware_VMFS&oldid=1077895290>, Mar. 18, 2022, 3 pages.

* cited by examiner

DETECTION OF UNAUTHORIZED DATA ENCRYPTION

BACKGROUND

A ransomware attack involves encrypting data on a computer or on multiple computers. In a ransomware attack, data can be encrypted using an encryption key, which renders the data inaccessible by users unless a ransom is paid to obtain the encryption key. A ransomware attack can be highly disruptive to enterprises, including businesses, government agencies, educational organizations, individuals, and so forth.

BRIEF DESCRIPTION OF THE DRAWINGS

Some implementations of the present disclosure are described with respect to the following figures.

Figure 1:
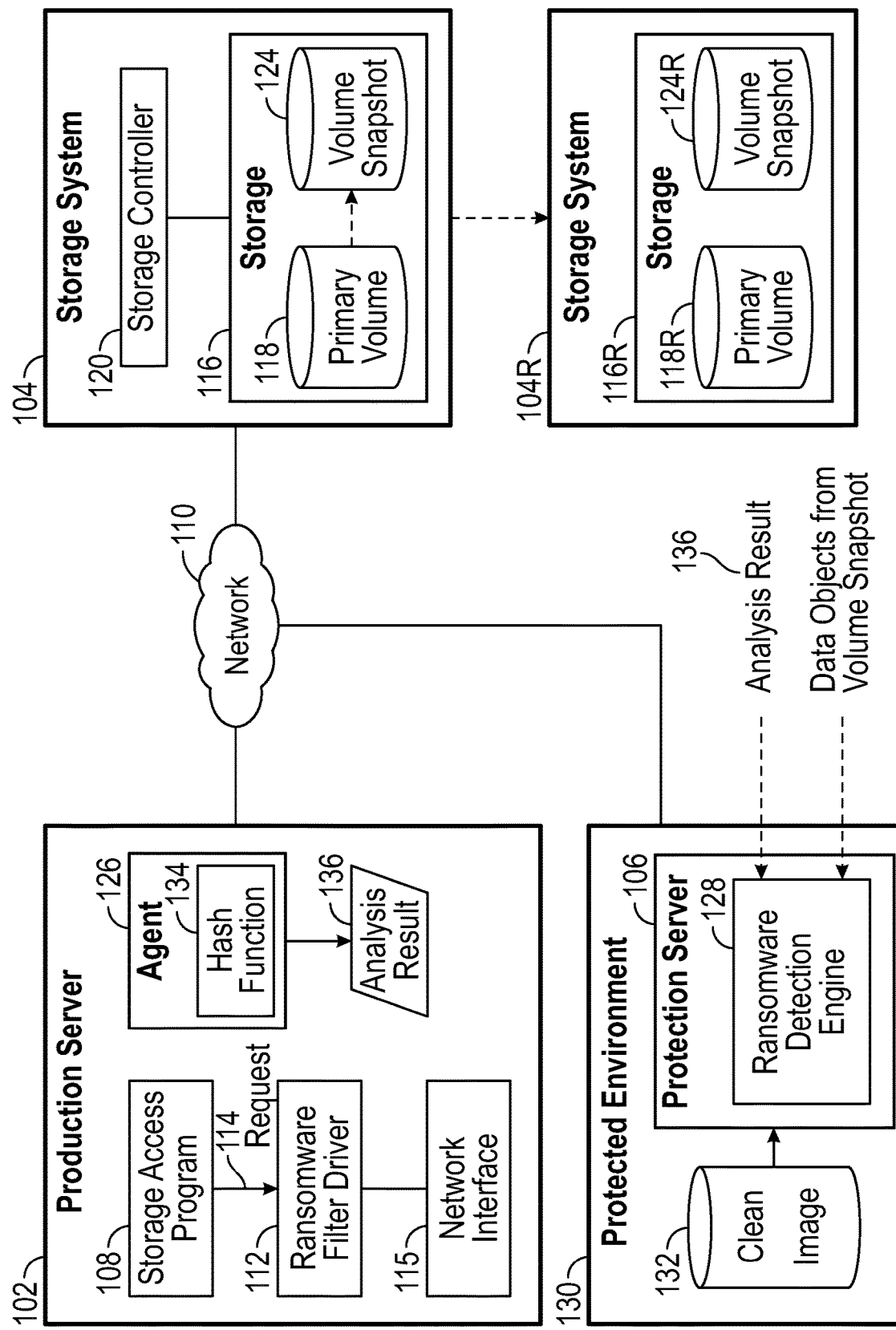
FIG. 1 is a block diagram of an arrangement that includes a production server and a protection server that is used for detecting presence of ransomware that attacks data of the production server, in accordance with some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A ransomware attack can be difficult to detect. By the time an enterprise (e.g., a business concern, an educational organization, a government agency, an individual, or any other entity) becomes aware of the attack, enough of the data has been encrypted to render the data unusable. A ransomware attack can be difficult to detect because normal computer operations may also encrypt data that is being stored to a storage system, so that distinguishing between authorized and unauthorized encryption of data can be challenging. When normal computer operations encrypt data, a ransomware detection technique that merely checks for encrypted data in input/output (I/O) operations with the storage system would not be effective since authorized I/O operations would contain encrypted data.

Enterprises may attempt to protect themselves from ransomware attacks by backing up data from computer(s) to backup storage systems. However, ransomware attacks often first attack a backup storage system to encrypt data on the backup storage system or, alternatively, delete the backup data, before encrypting data on the computer(s), so that both data in the backup storage system and on the computer(s) become inaccessible.

More recent ransomware attacks use a filter driver (referred to as "ransomware filter driver" in the ensuing discussion) that intercepts write requests and encrypts write data that is then written by the ransomware filter driver to a storage. In some cases, the ransomware filter driver encrypts data at a relatively slow pace to reduce the likelihood of detection of the ransomware filter driver. The ransomware filter driver gradually encrypts data written to the storage. However, when a requester (e.g., a user or other entity) requests a read of the encrypted data, the ransomware filter driver first decrypts the data, and returns the data in unencrypted form to the requester. Thus, users or other entities of a system do not realize that data has been encrypted by ransomware, since the users and other entities continue to have access to the data during the data encryption performed by the ransomware attack, which can occur over a relatively long period of time, such as days, weeks, months, and so forth.

In cases where the encryption of data by a ransomware attack occurs over a relatively long period of time, encrypted data may be copied to multiple backups of data. For example, in an example where an enterprise performs a data backup on a daily basis, then encrypted data as encrypted by the ransomware can be copied to each daily data backup, with each successive daily data backup incrementally including more encrypted data that has been encrypted by a ransomware filter driver. By the time the enterprise realizes that the enterprise's data has been subjected to the ransomware attack (such as at the point when the ransomware filter driver has stopped decrypting encrypted data in response to read requests), many of the data backups may no longer be useable due to the presence of the encrypted data.

As a result, the enterprise may not be able to recover, from the data backups, data that was added or modified during the ransomware attack. This may result in significant loss of data by the enterprise.

In accordance with some implementations of the present disclosure, ransomware detection is based on providing access, to a protection server, a snapshot of a volume updated by a production server. The production server may be infected with ransomware. An agent associated with the production server generates first signatures for data objects of the volume. The protection server generates second signatures for the data objects in the snapshot. The protection server can detect presence of ransomware in the production server based on comparing the first signatures to the second signatures.

A "volume" can refer to any logical structure to contain data. As examples, a "volume" can refer to a logical unit identified by a logical unit number (LUN), or any other identifiable unit of data storage.

Although reference is made to "ransomware" in some examples, it is noted that techniques or mechanisms according to some implementations are able to detect unauthorized encryption performed by any type of malware. "Malware" can refer to any entity (a user, a program, or a machine) that performs an activity that is designed to cause damage to or loss of data at a target system, or to perform unauthorized access of data of the target system.

Example Ransomware Detection Arrangement

FIG. 1 is a block diagram of an example arrangement that includes a production server 102, a storage system 104, and a protection server 106. The production server 102 can refer to a server that is used during normal operations to store data to the storage system 104. "Normal" operations can refer to operations associated with an enterprise (e.g., a business concern, an education organization, a government agency, an individual, etc.) as part of everyday activities of the enterprise. Although not shown, the production server 102 may be accessed by a client device (or multiple client devices) to cause retrieval of data from or writing of data to the storage system 104.

The production server 102 includes a storage access program 108 (including machine-readable instructions) that can receive data access requests, such as from client devices. In response to the data access requests, the storage access program 108 issues corresponding requests to the storage system 104 over a network 110. The requests issued to the storage system 104 can include read requests to read data from the storage system 104, or write requests to write data to the storage system 104.

In other examples, the production server 102 can additionally include application programs or other types of programs (e.g., an operating system (OS), a firmware, etc.) that can issue read and write requests to the storage system 104.

Although FIG. 1 shows just one production server 102, in other examples, multiple production servers may access the storage system 104.

The network 110 can include a storage area network (SAN), a local area network (LAN), a wide area network (WAN), a public network such as the Internet, and so forth.

The storage system 104 also includes a storage controller 120 which manages the access of data in a storage 116 in response to requests from the production server 102.

As used here, a "controller" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, a "controller" can refer to a combination of one or more hardware processing circuits and machine-readable instructions (software and/or firmware) executable on the one or more hardware processing circuits.

In some examples, the production server 102 can be a physical server. In other examples, the production server 102 can be a virtual server. A physical server is implemented using a physical computer or multiple physical computers. A virtual server can be implemented using a virtual machine (VM) or multiple virtual machines (VMs) or other types of virtualized entities, such as containers, etc. A "virtual machine" refers to a virtual emulation of a physical machine such as a computer.

In the example of FIG. 1, it is assumed that the production server 102 has been infected with ransomware in the form of a ransomware filter driver 112 (also referred to as a ransomware bridge). Although FIG. 1 depicts the ransomware filter driver 112 as being in the production server 102, in other examples, the ransomware filter driver 112 may reside outside of the production server 102 at any location (e.g., in a communication node such as a router or switch) that is able to intercept requests issued by the production server 102 to the storage system 104 over the network 110 for access (read access or write access) of data.

As depicted in FIG. 1, the storage access program 108 issues a request 114, which is intercepted by the ransomware filter driver 112. If the ransomware filter driver 112 were not present, then the request 114 would be transmitted through a network interface 115 of the production server 102 over the network 110 to the storage system 104 for processing by the storage controller 120 to access data stored by the storage 116. The network interface 115 can include a communication transceiver (that transmits and receives signals over the network 110) and any protocol layers that support use of various protocols for data communications.

If the ransomware filter driver 112 is present (as shown in FIG. 1), the ransomware filter driver 112 intercepts the request 114. If the request 114 is a write request, the ransomware filter driver 112 encrypts write data associated with the write request before sending the write request along with the encrypted write data over the network 110 to the storage system 104. This causes the storage controller 120 in the storage system 104 to write the encrypted write data to a storage 116 of the storage system 104. The storage 116 can be implemented with a collection of storage devices (a single storage device or multiple storage devices). Examples of storage devices can include disk-based storage devices, solid state drives, or other types of storage devices or memory devices.

In some examples, the encrypted write data (resulting from the unauthorized encryption performed by the ransomware filter driver 112) can be written to a primary volume 118 stored in the storage 116. A "primary volume" can refer to a volume that is to store data that is accessed in response to read and write requests from the production server 102.

Although FIG. 1 shows just one primary volume 118 in the storage 116, in other examples, there can be more than one primary volume 118 stored in the storage 116.

The ransomware filter driver 112 can also intercept read data retrieved in response to a read request issued by the storage access program 108. Thus, if the request 114 is a read request, the ransomware filter driver 112 would forward the read request to the storage system 104, which causes the storage controller 120 to read data from the primary volume 118. Note that the data read from the primary volume 118 may be encrypted data as encrypted by the ransomware filter driver 112. When the ransomware filter driver 112 receives the encrypted data in response to the read request, the ransomware filter driver 112 decrypts the encrypted data, and provides the decrypted version of the encrypted data to the storage access program 108. The storage access program 108 can provide the decrypted version of the encrypted data to a requester, such as a remote client device. In this manner, the requester of the data would be unaware that the data has already been encrypted at the storage system 104, since the requester receives the decrypted version of the encrypted data.

In accordance with some implementations of the present disclosure, the protection server 106 is used to detect unauthorized encryption of data in the storage system 104, such as unauthorized data encryption performed by the ransomware filter driver 112. The protection server 106 may be a physical server or a virtual server.

In some examples, there may be multiple protection servers 106, such as to support different types of production servers 102, such as production servers 102 that execute different types of OSs (e.g., WINDOWS OS, Linux OS, etc.) with respective different types of file systems. In such examples, the multiple protection servers 106 can support ransomware detection for different types of file systems.

In other examples, one protection server 106 can support different types of production servers 102, such as production servers 102 that employ different types of file systems.

The protection server 106 is located in a protected environment 130 to protect the protection server 106 from unauthorized access that may cause corruption of a ransomware detection engine 128 or some other feature of the protection server 106. As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits.

As an example, the protected environment 130 may be provided by a firewall which prevents any unauthorized access of the protection server 106. The protection server 106 can access entities (e.g., the storage system 104) on the network 110 through the firewall, but other entities may not be able to initiate communications with the protection server 106. In this way, the protection server 106 can be protected against corruption.

The protection server 106 can also be a "clean" server that has not been compromised, such as by malware. In some examples, the protection server 106 can boot from a "clean" image 132 that includes machine-readable instructions (including firmware, an OS, an application program, etc.) to be executed by the protection server. For example, the machine-readable instructions can include instructions of the ransomware detection engine 128.

The clean image 132 may be a read-only image that cannot be corrupted by updates. Also, the clean image 132 can be stored in a secure location to prevent unauthorized access of the clean image 132.

The protection server 106 may be booted from the clean image 132 on a periodic basis, e.g., daily, or any time the protection server 106 is to perform ransomware detection. Booting from the clean image 132 includes executing boot code (e.g., Basic Input/Output System (BIOS) code) in the protection server 106, loading an OS in the protection server 106, and loading other programs (including the ransomware detection engine 128) in the protection server 106 from the clean image 132. As noted above, the protection server 106 may be a physical server or a virtual server.

If a physical server, then the machine-readable instructions of the clean image 132 are executed in the computer(s) that make up the protection server 106. In such examples, the ransomware detection engine 128 can be implemented as a VM or multiple VMs in the protection server 106, an application program or multiple instances of the application program in the protection server 106, and so forth. In examples where multiple VMs or multiple instances of the application program are used to implement the ransomware detection engine 128, the multiple VMs or multiple instances of the application program can implement respective ransomware detection in parallel, such as to detect ransomware in multiple production servers 102.

If a virtual server, then the machine-readable instructions of the clean image 132 are executed in the virtual environment (e.g., a VM or multiple VMs) that make up the protection server 106.

To support the detection of a ransomware attack, an agent 126 is provided in the production server 102, a snapshot of the primary volume 118 is taken, and the ransomware detection engine 128 is provided in the protection server 106.

The creation of the snapshot of the primary volume 118 can be triggered by either the production server 102 or the storage system 104, to produce a volume snapshot 124 that can also be stored in the storage 116. A "snapshot" refers to a point-in-time copy of data. In the case of FIG. 1, the point-in-time copy of data is a copy of the primary volume 118. Multiple snapshots may be taken, where the multiple snapshots contain different copies of the volume at different points in time.

Assuming that the primary volume 118 contains encrypted data as encrypted by the ransomware filter driver 112 at the time the volume snapshot 124 was created, the volume snapshot 124 would also include the encrypted data. The volume snapshot 124 is accessible over the network 110 by the ransomware detection engine 128 in the protection server 106.

In some examples, data stored in the storage 116 of the storage system 104 can be replicated to one or more different storage systems 104R (which includes a storage 116R and a storage controller, not shown). The replication can be synchronous or asynchronous, or executed at time intervals. A storage replication process can replicate the entire content of the storage 116, or part of the content of the storage 116, to the storage 116R in the storage system 104R. For example, the replication process can copy the primary volume 118 to a replicated primary volume 118R and/or the volume snapshot 124 to a replicated volume snapshot 124R in the storage 116R. In other examples, the volume snapshot 124 is not replicated, but a copy of the volume snapshot is recreated from the copy of the primary volume 118R at the storage system 104R.

The replicated volume snapshot 124R is accessible over the network 110, or over a different network, by the ransomware detection engine 128 in the protection server 106.

In the ensuing discussion, reference to a volume snapshot (e.g., 124) can be to either the original volume snapshot (e.g., 124) or a replicated volume snapshot (e.g., 124R).

Operations of the Agent 126

The agent 126 can include machine-readable instructions executable on the production server 102. The agent 126 is able access data objects (e.g., files, blocks, etc.) in the primary volume 118. In some examples, the agent 126 can apply a function on the content of each data object (or a portion of each data object) to produce a respective signature. For example, the applied function can be a hash function 134 that produces an output hash value based on an input including a data object (or data object portion). The hash function 134 may be a cryptographic hash function, such as a message-digest hash function, a secure hash algorithm (SHA) hash function, and so forth.

In other examples, other types of functions can be used, such as functions to produce checksums or other types of signatures.

In some examples, the data objects in the primary volume 118 accessed by the agent 126 are those data objects with update times (e.g., a data object is updated if the data object is added or modified) in a test time interval starting at time $T_{start}$ and ending at time $T_{end}$. The test time interval is the time interval for detection of a ransomware attack, based on data objects that have been updated in the test time interval. By focusing on just the data objects in the test time interval, the quantity of data objects that have to be analyzed for ransomware detection can be reduced.

Once a current test time interval is completed, $T_{start}$ and $T_{end}$ can be changed to specify the next test time interval. Thus, in some examples, ransomware detection is performed on a time interval by time interval basis in successive test time intervals.

The agent 126 calculates a signature for each data object in the current test time interval (i.e., a data object updated in the current test time interval). In some examples, instead of calculating signatures for all data objects in the current test time interval, the agent 126 can calculate signatures for a sampled subset (less than all) of the data objects in the current test time interval.

In other examples, instead of performing ransomware detection based on analyzing data objects in successive test time intervals, ransomware detection can be based on analyzing all (or some subset) of the data objects of the primary volume 118 and the volume snapshot 124.

Since the agent 126 resides in the production server 102 (which may have been infected with the ransomware filter driver 112), any encrypted data object (encrypted by the ransomware filter driver 112) retrieved by the agent 126 from the primary volume 118 would be decrypted first by the ransomware filter driver 112. Thus, the agent 126 would produce a hash value based on the decrypted version of the encrypted data object.

The agent 126 can store hash values produced by the hash function 134 for data objects in the primary volume 118 that have been updated in the current test time interval in an analysis result 136 (e.g., an analysis result file or other data structure that stores the hash values produced by the agent 126). In some examples, the agent 126 can write the analysis result 136 to the primary volume 118 (or to a separate storage location of the storage 116). Alternatively, the analysis result 136 can be provided in a different way to the protection server 106, such as over the network 110 in response to a request from the protection server 106.

In some examples, the analysis result 136 can be encrypted, such as with an encryption key (e.g., a public key of a public-private key pair), by the agent 126 prior to the agent 126 writing the analysis result 136 to the storage 116. The encryption of the analysis result 136 protects the contents of the analysis result 136 from unauthorized access, such as by the ransomware filter driver 112.

By writing the analysis result 136 to the storage 116 rather than communicating the analysis result 136 directly to the protection server 106, security of the protection server 106 is enhanced since a path from the infected production server 102 to the protection server 106 is avoided.

In response to writing the analysis result 136, such as to the primary volume 118 or to another location, the agent 126 can trigger the creation of the volume snapshot 124 based on the content of the primary volume 118 at the time of creation of the volume snapshot 124.

The analysis result 136 contains an entry for each data object analyzed. In some examples, each entry can include the following items for a respective data object being analyzed: 1) a storage location indicator (e.g., a file path) that indicates where the respective data object is stored in the storage 116), 2) time information (e.g., time of creation of the respective data object and/or time of modification of the respective data object), 3) the corresponding hash value for the respective data object, and 4) any other metadata associated with the respective data object.

In other examples, each entry of the analysis result 136 can include other information for a respective data object being analyzed.

Example Ransomware Detection Operations

The protection server 106 may be configured with configuration information that identifies volumes (including the volume snapshot 124) to scan for ransomware. The configuration information may be provided by a network administrator or another entity to the protection server 106.

The ransomware detection engine 128 retrieves data objects from the volume snapshot 124, and generates hash values (e.g., by applying a hash function that is similar to the hash function 134) based on the retrieved data objects. Since the protection server 106 has not been infected with ransomware such as the ransomware filter driver 112, then any data object read by the ransomware detection engine 128 would not be first processed by the ransomware filter driver 112. As a result, if a particular data object in the volume snapshot 124 has been encrypted by the ransomware filter driver 112, then the ransomware detection engine 128 would read the encrypted particular data object, and not a decrypted version of the particular data object.

The ransomware detection engine 128 also retrieves the analysis result 136 from the storage 116. In examples where the analysis result 136 was written by the agent 126 to the primary volume 118, the volume snapshot 124 would also include a copy of the analysis result 136 since the creation of the volume snapshot 124 was triggered by the agent 126 after the agent wrote the analysis result 136 to the primary volume 118. The ransomware detection engine 128 retrieves the copy of the analysis result 136 from the volume snapshot 124.

If the analysis result 136 is encrypted, the ransomware detection engine 128 decrypts the encrypted analysis result 136 using an encryption key, such as a private key of the public-private key pair.

The ransomware detection engine 128 identifies data objects associated with hash values in the analysis result 136, where these data objects were updated in a respective test time interval. The ransomware detection engine 128 retrieves copies of the identified data objects from the volume snapshot 124 (using storage location indicators in the analysis result 136), and generates hash values by applying the hash function on the data objects retrieved from the volume snapshot 124. The ransomware detection engine 128 then compares the hash values in the analysis result 136 with the generated hash values. Mismatches between the hash values indicate presence of an unauthorized data encryption.

Note that if the ransomware detection engine 128 detects that the format and/or the content of the analysis result 136 retrieved from the volume snapshot 124, is invalid, then this situation may be an indication of a ransomware attack that has corrupted the analysis result 136 itself, and the ransomware detection engine 128 can issue a ransomware attack indication.

Figure 2:
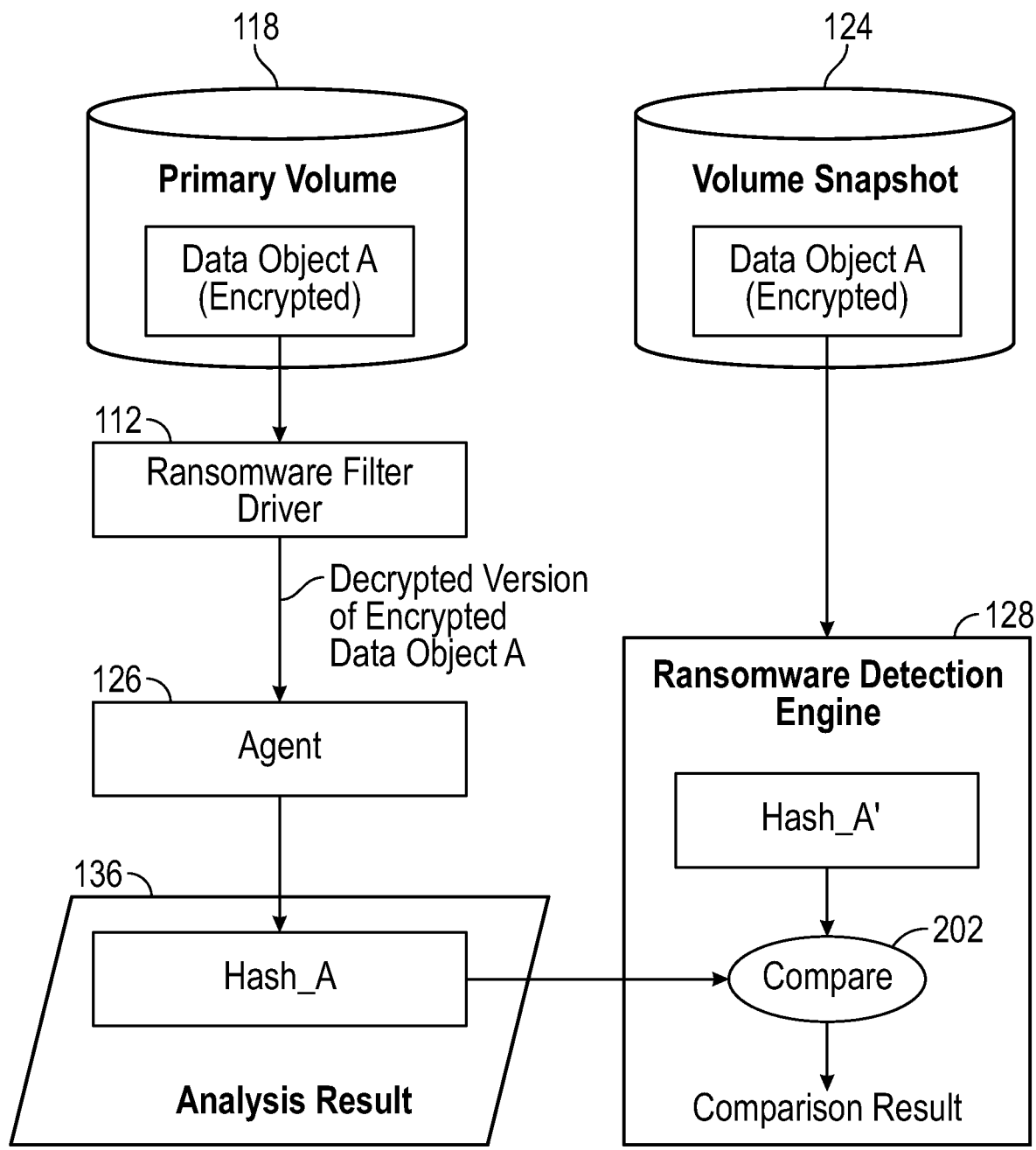
FIG. 2 is a block diagram of an example of comparing hash values to detect a ransomware attack, according to some examples.

FIG. 2 shows an example of how the ransomware detection engine 128 can use the volume snapshot 124 and the analysis result 136 to determine whether a ransomware attack is occurring. The agent 126 reads data object A from the primary volume 118. It is assumed that data object A was previously encrypted by the ransomware filter driver 112 before being stored in the primary volume 118. The ransomware filter driver 112 intercepts encrypted data object A read from the primary volume 118, and decrypts encrypted data object A to produce a decrypted version of encrypted data object A. The decrypted version of encrypted data object A is provided by the ransomware filter driver 112 to the agent 126, which applies the hash function 134 (FIG. 1) on the decrypted version of encrypted data object A to produce output hash value Hash_A. Hash_A is written to an entry in the analysis result 136 along with a storage location indicator (e.g., a file path) of data object A, and other metadata associated with data object A.

The ransomware detection engine 128 reads data object A from the volume snapshot 124. Note that the volume snapshot 124 was created at the time that the agent 126 finished populating the analysis result 136 and wrote the analysis result 136 to the storage system 104. As a result, since data object A in the primary volume 118 was encrypted, the copy of data object A in the volume snapshot 124 is also encrypted.

The ransomware detection engine 128 reads data object A from the volume snapshot 124. Since the protection server 106 is not infected with the ransomware filter driver 112, data object A read from the volume snapshot 124 and received by the ransomware detection engine 128 remains in encrypted form. The ransomware detection engine 128 applies the hash function on the encrypted data object A and outputs hash value Hash_A'. Note that Hash_A' differs from Hash_A in the analysis result 136 since Hash_A was generated based on the decrypted version of encrypted data object A.

The ransomware detection engine 128 retrieves Hash_A from the analysis result 136. The ransomware detection engine 128 compares the generated hash values to corresponding hash values in the analysis result 136 produced by the agent 126. The comparison includes comparing (at 202) Hash_A from the analysis result 136 to Hash_A' generated by the ransomware detection engine 128. If the ransomware detection engine 128 detects a mismatch between Hash_A and Hash_A', then that may indicate a ransomware attack may be present.

If some quantity (1 or more than 1) of mismatches between hash values in the analysis result 136 and hash values generated by the ransomware detection engine 128 based on data objects retrieved from the volume snapshot 124 is detected, then the ransomware detection engine 128 can provide a ransomware attack indication, e.g., a message, an alert, etc.

The ransomware attack indication may be sent to a target entity, such as the production server 102, a device associated with a network administrator, and so forth. In response to the ransomware attack indication, the target entity can take a remediation action, which can include any or some combination of the following: disable (e.g., power down) the production server 102 or a portion of the production server 102, disable network access by the production server 102, perform a malware scan of the production server 102, and so forth.

Ransomware detection techniques according to some examples of the present disclosure are lightweight, i.e., the ransomware detection techniques do not consume so much of the resources of the production server 102 that requesters may notice a significant slowdown in data access operations. The ransomware detection techniques are lightweight because the agent 126 does not have to run in real-time as data objects are created or modified—rather, the agent 126 can generate the analysis result 136 at specified times, e.g., once a day, once every hour, once a week, etc. The computational complexity of calculating signatures (e.g., hash values) for data objects is relatively low. Additionally, the agent 126 can choose to generate hash values for a small sample (e.g., 1% or some other percentage) of the new or modified data objects in a current test time interval.

Further Examples Relating to Different Types of Production Servers

In some examples, the production server 102 is a physical server. In other examples, the production server 102 is a virtual server.

In examples where the production server 102 is a physical production server, a Fibre Channel (FC) or Internet Small Computer Systems Interface (iSCSI) connection can be established between the protection server 106 and a volume (e.g., the volume snapshot 124) associated with the physical production server 102. With an FC or iSCSI connection, a port (e.g., a port of a firewall that provides the protected environment 130) dedicated to the protection server 106 is used by the protection server 106 to access the volume snapshot 124 over the network 110 or over a different independent network. In other examples, other types of connections can be established between the protection server 106 and the volume snapshot 124 over the network 110 or different independent networks.

Figure 3:
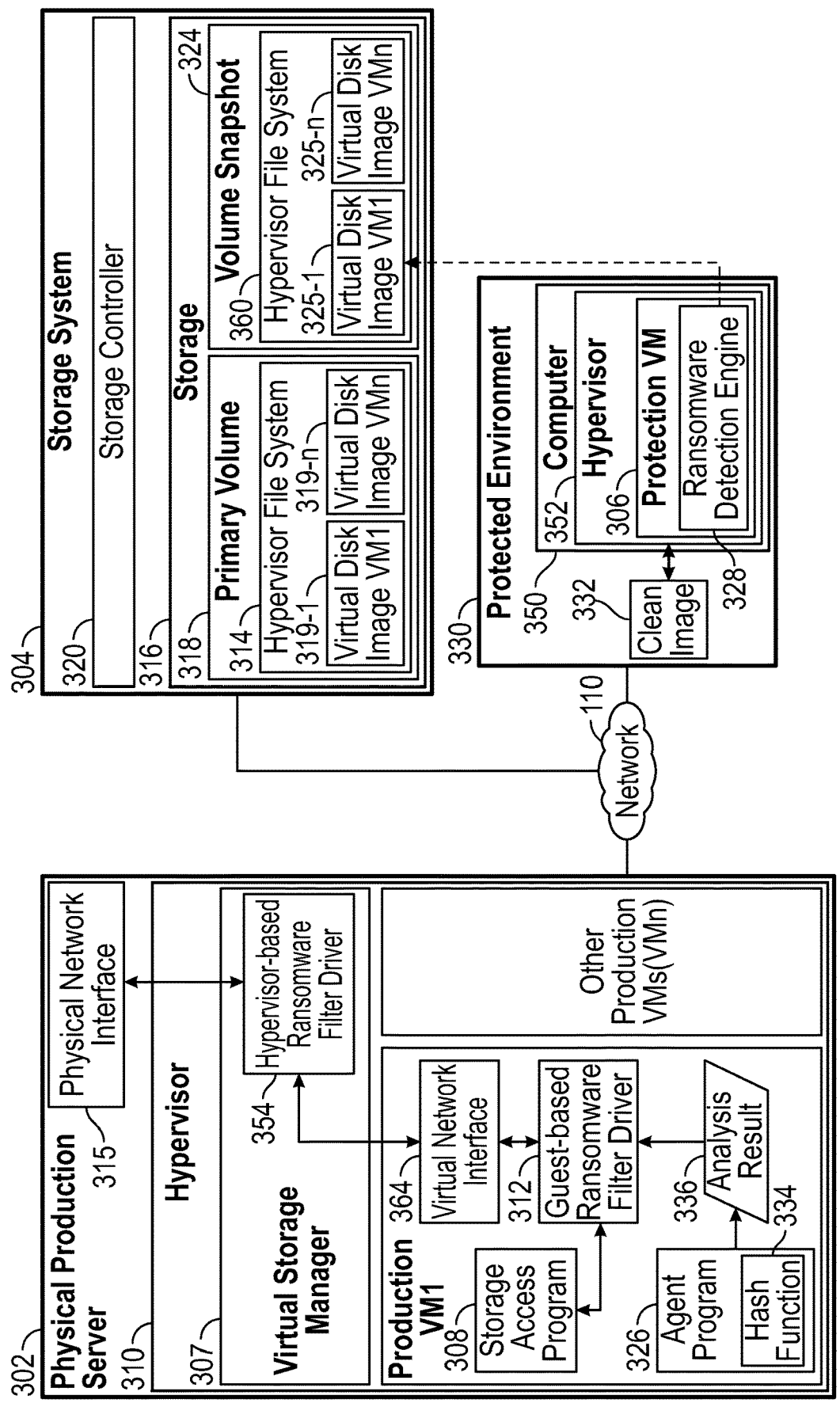
FIG. 3 is a block diagram of an arrangement that includes a virtual production server and a protection server that is used for detecting presence of ransomware that attacks data of the production server, in accordance with some examples.

FIG. 3 depicts an example in which a production server being protected is a virtual production server, which includes a production VM or multiple production VMs (e.g., production VM1 to production VMn, where n≥1). In a different example, there may just be one production VM. A "production VM" is a VM that is used during normal operations to store data to a storage system 304. A physical production server 302 (made up of a physical computer or multiple physical computers) executes a hypervisor 310 (also referred to as a VMM). A hypervisor emulates physical resources of a physical computer system (including a computer or multiple computers) for use by VMs. Examples of physical resources include processor resources, storage resources, and communication resources.

The hypervisor 310 provides the virtual infrastructure for running VMs including production VM1 and possibly other production VMs, up to VMn (where n 1). The hypervisor 310 emulates the physical resources of the physical production server 302 for use by the production VMs.

The hypervisor 310 includes a virtual storage manager 307 that submits requests (e.g., read requests or write requests) to the storage system 304 over the network 110, in response to data access performed by any of the production VMs. The requests are sent by the virtual storage manager 307 through a physical network interface 315 (similar to the network interface 115 of FIG. 1) over the network 110 to the storage system 304.

Production VM1 includes a storage access program 308 that can perform tasks similar to those of the storage access program 108 of FIG. 1. Access requests (read requests or write requests) submitted by the storage access program 308 are processed by the virtual storage manager 307 and sent to the storage system 304 over the network 110.

Production VM1 also includes an agent program 326 that performs tasks similar to those of the agent 126 of FIG. 1, including generating an analysis result 336 (similar to 136 in FIG. 1) including signatures of data objects (e.g., hash values based on application of a hash function 334) on data in a virtual disk image of VM1 (319-1) encapsulated in a hypervisor file system 314 in a primary volume 318 stored in a storage 316 of the storage system 304. The storage system 304 includes a storage controller 320 that controls access of data in the storage 316.

The other production VMs in the physical production server 302 can have an arrangement similar to that of production VM1.

Each VM can have one or multiple virtual disk images that store data for the VM. For example, production VM1 writes or reads data in virtual disk image 319-1, and production VMn writes or reads data in virtual disk image 319-n. Additionally, the hypervisor 310 can store the virtual disk images 319-1 to 319-*n* in a single primary volume 318, as depicted in FIG. 3, or alternatively, in multiple primary volumes.

FIG. 3 also shows a protection server in the form of a protection VM 306 that performs tasks similar to that of the protection server 106 of FIG. 1. The protection VM 306 executes in a physical computer 350 (or physical computers) that is within a protected environment 330 similar to the protected environment 130 of FIG. 1. The protection VM 306 is managed by a hypervisor 352 that executes in the physical computer 350.

The protection VM 306 includes a ransomware detection engine 328 that performs tasks similar to those of the ransomware detection engine 128 of FIG. 1), including ransomware detection to detect whether or not a production VM (e.g., production VM1 to VMn) has been infected with ransomware, including a ransomware filter driver.

FIG. 3 shows an example in which a ransomware filter driver can infect either a production VM (e.g., production VM1) or the hypervisor 310, or both.

In examples where a guest-based ransomware filter driver 312 has infected production VM1, the guest-based ransomware filter driver 312 in the production VM1 behaves similarly to the ransomware filter driver 112 in FIG. 1 to corrupt data in the virtual disk image of VM1 319-1. The guest-based ransomware filter driver 312 intercepts any write requests issued by the production VM1 to the storage system 304, and encrypts write data of the write requests to cause writing of encrypted write data to the virtual disk image of VM1 319-1 through a virtual network interface 364 of production VM1. The guest-based ransomware filter driver 312 also intercepts read data in response to read requests. If the read data is encrypted, the guest-based ransomware filter driver 312 decrypts the encrypted read data to produce a decrypted version of the encrypted read data, before forwarding the decrypted version of the encrypted read data to production VM1.

In examples where a hypervisor-based ransomware filter driver 354 has infected the hypervisor 310, the hypervisor-based ransomware filter driver 354 may corrupt data written to the primary volume 318, as well as corrupt a logical structure associated with a storage of data for the primary volume 318, including the hypervisor file system 314 and the contained virtual disk images 319-1 to 319-*n*. For example, the primary volume 318 may include the hypervisor file system 314 that stores data in virtual disk images 319-1 to 319-*n*. In a specific example, the hypervisor file system 314 may be a VM file system (VMFS) from VMWare, Inc. In such a specific example, as depicted in FIG. 3, the virtual disk images 319-1 to 319-*n* are VM disks (VMDKs), where a VMDK refers to a file format relating to a container for virtual storage devices used by VMs to store production data. In other examples, the hypervisor file system 314 and the virtual disk images 319-1 to 319-*n* are defined according to other hypervisor definitions. A VMDK can include a collection of files (e.g., a single file or multiple files) accordingly to the VM's guest operating system and file system format. In some examples, each VM has a single virtual disk associated with the VM. In other examples, each VM can have one or multiple virtual disks associated with the VM.

There are examples where a production hypervisor is connected to multiple storage systems, and every storage system has multiple primary volumes, and each primary volume can have multiple hypervisor file systems, and each file system contains multiple virtual disk images. In any of the various possible examples, a hypervisor-based ransomware filter driver (e.g., 354) can encrypt and corrupt production data belonging the one or multiple production VMs.

As shown in FIG. 3, a volume snapshot 324 can be created that is a copy of the primary volume 318. The volume snapshot 324 includes a hypervisor file system 360 that is a copy of the hypervisor file system 314 in the primary volume 318, and virtual disk images 325-1 to 325-*n* that are copies of the virtual disk images 319-1 to 319-*n* in the primary volume 318. The creation of the volume snapshot 324 can be triggered by the agent program 326 in response to producing the analysis result 336, which can include signatures of data objects (e.g., files) in the virtual disk images 319-1 319-*n* inside the primary volume 318 in a respective test time interval. In other examples, the volume snapshot 324 is created after analysis results (including 336) are created for multiple production VMs and not after the analysis result 336 is created for just one VM.

The protection VM 306 can be a clean VM that is booted from a clean image 332 in the protected environment 330.

In examples where the guest-based ransomware filter driver 312 has infected production VM1, the ransomware detection engine 328 can detect presence of the ransomware attack by comparing signatures in the analysis result 336 with corresponding signatures generated by the ransomware detection engine 328 from corresponding data objects in one or more of the virtual disk images (325-1 to 325-*n*) associated to the production VM1 and stored in the volume snapshot 324.

In examples where the hypervisor-based ransomware filter driver 354 has infected the hypervisor 310, the ransomware detection engine 328 can detect a ransomware attack if the ransomware detection engine 328 is unable to mount the volume snapshot 324. A volume is mounted to a server, including the protection VM 306, to allow the protection VM 306 to access the volume. If the ransomware detection engine 328 is unable to mount the volume snapshot 324 and/or is unable to open the volume snapshot 324, then that is an indication of corruption of the hypervisor file system 314, such as by the hypervisor-based ransomware filter driver 354.

If the volume snapshot 324 is successfully mounted, and the hypervisor file system 314 is correctly accessed, and the single or multiple virtual disk images associated with VM1 (325-1 to 325-*n*) are connected to the protection VM 306, then the detection proceeds the same way as described above for a guest-based filter driver. In this example, the ransomware detection engine 328 also performs data object signature comparisons of signatures in the analysis result with corresponding signatures generated by the detection engine 328 based on data objects in the volume snapshot 324 and included virtual disks.

In some examples, multiple protection VMs 306 each with a respective ransomware detection engine 328 can be executed in parallel for improved throughput.

Further Examples

In some examples, a mismatch between a signature in an analysis result for a given data object and a signature generated by the ransomware detection engine 128 based on a copy of the given data object retrieved from the volume snapshot 124 may be due to an authorized operation of the production server 102 (i.e., an operation of the production server 102 that is not initiated by the ransomware filter driver 112).

For example, for the given data object, the agent 126 may have computed a first signature at time $T_a$ and triggered the creation of the volume snapshot 124 at time $T_b$. At time $T_c$ where $T_a<T_c<T_b$ (i.e., $T_c$ is between $T_a$ and $T_b$), a legitimate requester may update the given data object. This would cause the second signature generated for the given data object (version at time $T_c$) retrieved from the volume snapshot 124 to be different from the first signature in the analysis result 136 (the first signature is based on the version of the given data object at time $T_a$), and may cause a false indication of a ransomware attack.

To address this issue, the ransomware detection engine 128 can check the time information associated with the first signature in the analysis result 136, and determine if the update time indicated by the time information is different from an update time of the given data object retrieved from the volume snapshot 124. If the update time from the analysis result 136 is different from the update time of the given data object in the volume snapshot 124, then that would indicate to the ransomware detection engine 128 that the ransomware detection engine 128 should not compare the signatures for the given data object for ransomware detection. As a result, the ransomware detection engine 128 can skip the comparison of the signatures for the given data object.

As another example, the OS of the production server 102 or another may have legitimately encrypted a data object. In such a scenario, metadata associated with the data object may indicate the encryption of the data object. If the ransomware detection engine 128 detects based on the metadata that the data object was legitimately encrypted, then the ransomware detection engine 128 can skip the comparison of the signatures for the data object. In some examples, the ransomware detection engine 128 may retrieve the encryption key, and/or the permissions to undo the encryption so that the data can be analyzed for corruption.

In further examples, the production server 102 may use BitLocker, which is a disk volume encryption and security program released by Microsoft Corporation that legitimately encrypts data of a volume (such as the primary volume 118) by encrypting data when writing to the volume, and decrypting data when reading data from the volume. Although reference is made to BitLocker, other similar programs may be present in the production server 102 in other examples. The BitLocker may behave similarly to the ransomware filter driver 112, except that the encryption performed by the BitLocker is authorized. To address the presence of the BitLocker in the production server 102, the ransomware detection engine 128 can elect to either: 1) skip ransomware detection based on data objects for any volume associated with a production server including a BitLocker, or 2) include a BitLocker and the encryption key in the protection server 106 that can reverse the encryption performed by the BitLocker in the production server.

Figure 4:
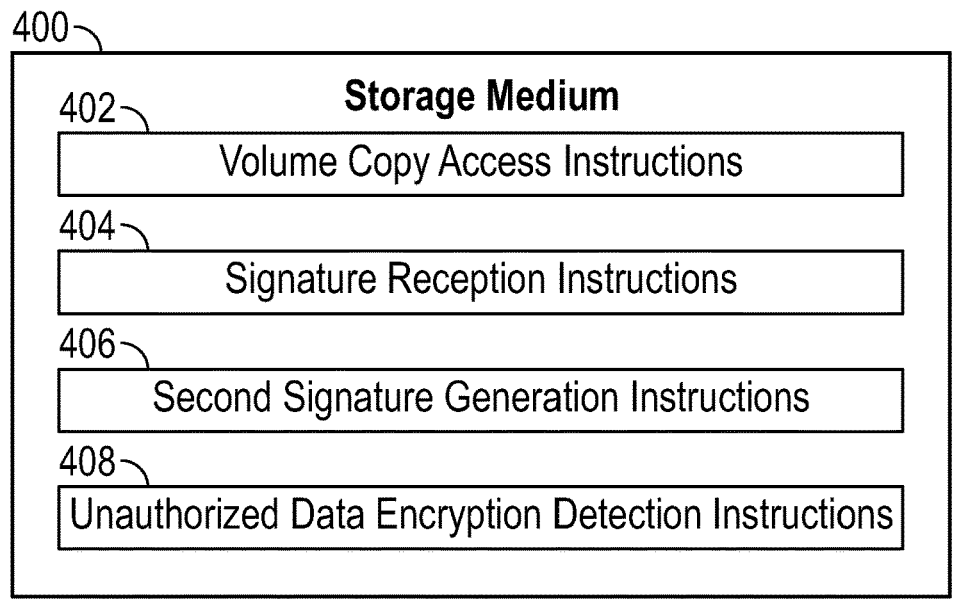
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause at least one processor to perform various tasks. A processor can include a microprocessor, a core of a multi-core microprocessor, a microcontroller, a programmable integrated circuit, a programmable gate array, or another hardware processing circuit.

The machine-readable instructions include volume copy access instructions 402 to provide access, to a first server, of a copy of a volume of data associated with a second server, where the first server is protected against unauthorized access.

For example, the first server can be the protection server 106 or the protection VM 306 of FIG. 1 or 3, respectively, and the copy of the volume can be the volume snapshot 124 or the virtual disk image 325-1.

The first server is protected against unauthorized access based on isolating the first server from external access over a network, such as providing the first server in the protected environment 130 or 330 of FIG. 1 or 3, respectively.

The machine-readable instructions include agent signature reception instructions 404 to receive, at the first server, the first signatures generated by an agent (e.g., 126 or 326 in FIG. 1 or 3, respectively) in the second server based on applying a function on data objects of the volume.

The second server can be the production server 102 or a production VM of FIG. 1 or 3, respectively. The function can be a hash function, such as a SHA-256 or another hash function.

In some examples, the first signatures are derived based on applying the function on the data objects of the volume that have been updated within a test time interval.

The machine-readable instructions include second signature generation instructions 406 to generate, at the first server, second signatures derived based on applying the function on data objects contained in the copy of the volume or of the copy of the virtual disk image.

In some examples, the machine-readable instructions can retrieve data objects from the copy of the volume, and generate the second signatures based on the retrieved data objects, such as by applying a hash function to the retrieved data objects.

The machine-readable instructions include unauthorized data encryption detection instructions 408 to determine whether malware that performs unauthorized data encryption of data of the second server is present, based on comparing the second signatures to the first signatures.

If there is greater than a predetermined number (1 or greater than 1) of mismatches between the first signatures and corresponding second signatures, then the machine-readable instructions can indicate presence of unauthorized data encryption.

In some examples, creation of the copy of the volume is triggered by the agent in the second server, such as in response to writing, by the agent, a result (e.g., 136 or 336 of FIG. 1 or 3, respectively) to the storage system.

In some examples, the first server is booted from a clean image (e.g., 132 or 332 in FIG. 1 or 3, respectively) prior to the first server performing an analysis to determine whether the malware that performs unauthorized data encryption is present, the analysis including the providing of the access to the copy of the volume, the receiving, the generating, and the determining.

In some examples, the volume includes a file system, and the data objects include files of the file system. In some examples, the first server supports checking for malware for different types of file systems.

In some examples, the machine-readable instructions indicate that the malware that performs unauthorized data encryption is present in response to being unable to mount or open the volume.

Figure 5:
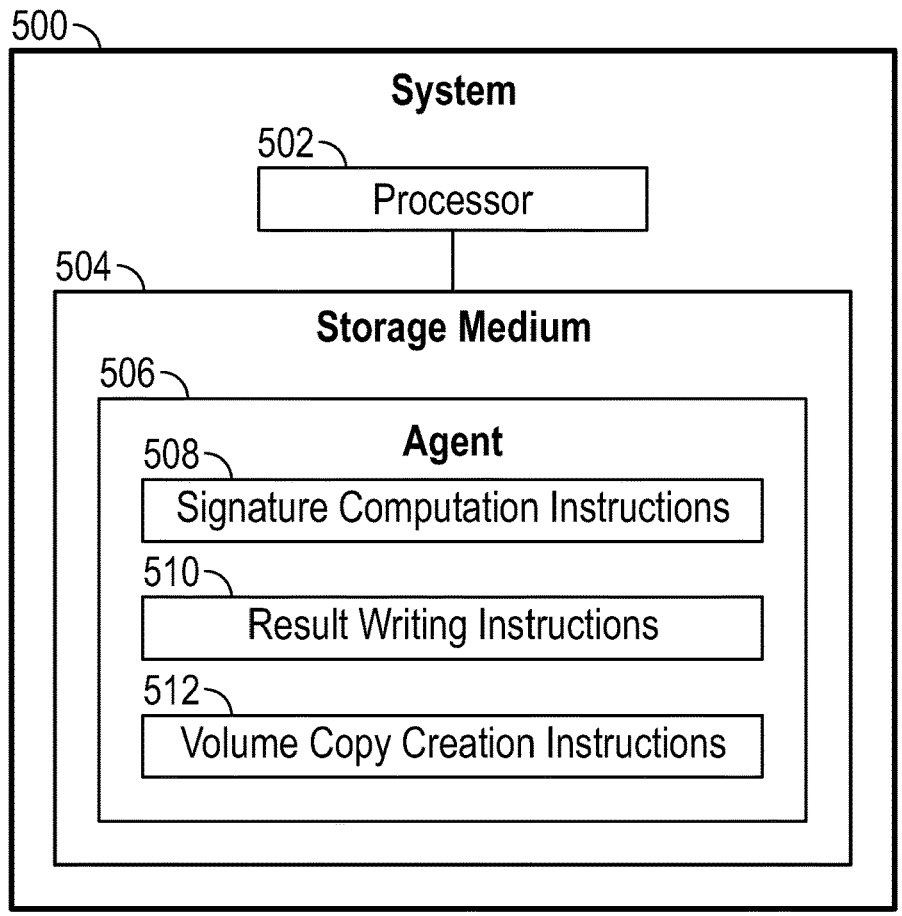
FIG. 5 is a block diagram of a storage system according to some examples.

FIG. 5 is a block diagram of a system 500 according to some examples. The system 500 may include a computer or multiple computers.

The system 500 includes a processor 502 (or multiple processors), and a storage medium 504 that stores an agent 506 executable on the processor 502 to perform various tasks. The agent 506 executable on a hardware processor can refer to the agent 506 executable on a single processor or the agent 506 executable on multiple processors.

The agent 506 includes signature computation instructions 508 to compute signatures for data objects written to a volume in a storage system. The signatures may be hash values generated by applying a hash function to the data objects.

The agent 506 includes result writing instructions 510 to write a result including the signatures to the storage system. The result can include an encrypted file, and the result can include entries for respective data objects. Each entry can include a corresponding signature of a respective data object, a storage location indicator of the respective data object, and possibly other information.

The agent 506 includes volume copy creation instructions 512 to, in response to writing the result including the signatures to the storage system, trigger a creation of a copy of the volume at the storage system. The signatures of the result are for comparison by an unauthorized data encryption detection engine (e.g., the ransomware detection engine 128 or 328 of FIG. 1 or 3, respectively) to signatures generated by a server (e.g., the protection server 106) based on corresponding data objects retrieved by the unauthorized data encryption detection engine from the copy of the volume at the storage system.

Figure 6:
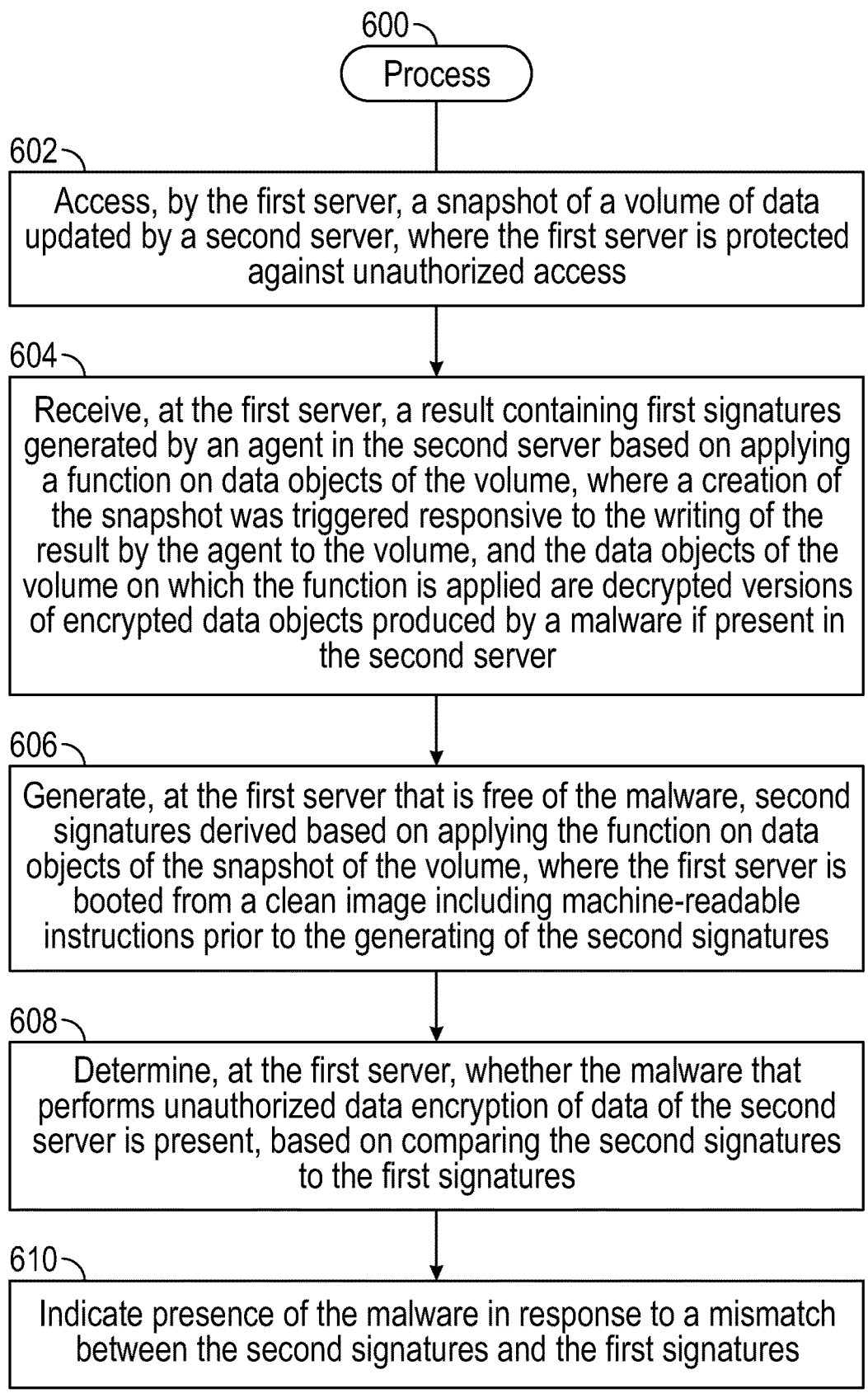
FIG. 6 is a flow diagram of a process according to some examples.

FIG. 6 is a flow diagram of a process 600 according to some examples.

The process 600 includes accessing (at 602), by the first server, a snapshot of a volume of data updated by a second server, where the first server is protected against unauthorized access.

The first server can be the protection server 106 or protection VM 306 of FIG. 1 or 3, respectively.

The process 600 includes receiving (at 604), at the first server, a result containing first signatures generated by an agent in the second server based on applying a function on data objects of the volume, where a creation of the snapshot was triggered responsive to the writing of the result by the agent to the volume, and the data objects of the volume on which the function is applied are decrypted versions of encrypted data objects produced by a malware if present in the second server (e.g., the decrypted version of encrypted data object A from the ransomware filter driver 112 of FIG. 2).

The second server may be the production server 102 or a production VM of FIG. 1 or 3, respectively. The first signatures may be hash values, and can be based on data objects updated during a test time interval.

The process 600 includes generating (at 606), at the first server that is free of the malware, second signatures derived based on applying the function on data objects of the snapshot of the volume, where the first server is booted from a clean image (e.g., 132 in FIG. 1) including machine-readable instructions prior to the generating of the second signatures. The second signatures may be hash values.

The process 600 includes determining (at 608), at the first server, whether the malware that performs unauthorized data encryption of data of the second server is present, based on comparing the second signatures to the first signatures.

A mismatch between the first signatures and the second signatures indicate presence of the malware that performs unauthorized data encryption of data.

The process 600 includes indicating (at 610) presence of the malware in response to a mismatch between the second signatures and the first signatures.

A storage medium (e.g., 400 in FIG. 4 or 504 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause at least one processor to:

provide access, to a first server, of a copy of a volume of data associated with a second server, wherein the first server is protected against unauthorized access;

receive, at the first server, first signatures generated by an agent in the second server based on applying a function on data objects of the volume;

generate, at the first server, second signatures derived based on applying the function on data objects of the copy of the volume; and determine, at the first server, whether malware that performs unauthorized data encryption of data of the second server is present, based on comparing the second signatures to the first signatures;

boot the first server from a clean image prior to the first server performing an analysis to determine whether the malware that performs unauthorized data encryption is present, the analysis comprising the providing of the access to the copy of the volume, the receiving, the generating, and the determining.

2. The non-transitory machine-readable storage medium of claim 1, wherein the function comprises a hash function, the first signatures are first hash values, and the second signatures are second hash values.

3. The non-transitory machine-readable storage medium of claim 1, wherein the first signatures received from the agent in the second server are part of a result that includes the first signatures and storage location indicators of the data objects.

4. The non-transitory machine-readable storage medium of claim 3, wherein the result is encrypted.

5. The non-transitory machine-readable storage medium of claim 3, wherein the instructions upon execution cause the at least one processor to:
in response to being unable to access a content of the result, provide an indication that the malware that performs unauthorized data encryption is present.

6. The non-transitory machine-readable storage medium of claim 1, wherein the first server is protected against unauthorized access based on isolating the first server from external access over a network.

7. The non-transitory machine-readable storage medium of claim 1, wherein the first signatures are derived based on applying the function on the data objects of the volume that have been updated within a test time interval.

8. The non-transitory machine-readable storage medium of claim 1, wherein the volume comprises a file system, and the data objects comprise files of the file system.

9. The non-transitory machine-readable storage medium of claim 8, wherein the first server supports checking for malware for different types of file systems.

10. The non-transitory machine-readable storage medium of claim 8, wherein the instructions upon execution cause the at least one processor to:
indicate that the malware that performs unauthorized data encryption is present in response to being unable to mount or open the volume.

11. The non-transitory machine-readable storage medium of claim 1, wherein the first server comprises a virtual machine.

12. The non-transitory machine-readable storage medium of claim 11, wherein the instructions upon execution cause the at least one processor to:
execute multiple virtual machines to scan multiple second servers for presence of malware that performs unauthorized data encryption.

13. A non-transitory machine-readable storage medium comprising instructions that upon execution cause at least one processor to:
provide access, to a first server, of a copy of a volume of data associated with a second server, wherein the first server is protected against unauthorized access;
receive, at the first server, first signatures generated by an agent in the second server based on applying a function on data objects of the volume;
generate, at the first server, second signatures derived based on applying the function on data objects of the copy of the volume; and
determine, at the first server, whether malware that performs unauthorized data encryption of data of the second server is present, based on comparing the second signatures to the first signatures;
wherein the copy of the volume is a snapshot of the volume triggered by the agent in the second server, and
wherein creation of the snapshot of the volume is triggered by the agent in response to the agent writing a result including the first signatures to a storage.

14. A method of a first server, comprising:
accessing, by the first server, a snapshot of a volume of data updated by a second server, wherein the first server is protected against unauthorized access;
receiving, at the first server, a result containing first signatures generated by an agent in the second server based on applying a function on data objects of the volume, wherein a creation of the snapshot was triggered responsive to a writing of the result by the agent to the volume, the result contains the first signatures, and the data objects of the volume on which the function is applied are decrypted versions of encrypted data objects produced by a malware if present in the second server;
generating, at the first server that is free of the malware, second signatures derived based on applying the function on data objects of the snapshot of the volume, wherein the first server is booted from a clean image including machine-readable instructions prior to the generating of the second signatures;
determining, at the first server, whether the malware that performs unauthorized data encryption of data of the second server is present, based on comparing the second signatures to the first signatures; and
indicating presence of the malware in response to a mismatch between the second signatures and the first signatures.

15. The method of claim 14, wherein the booting of the first server from the clean image is further prior to the first server accessing the snapshot, receiving the result, and determining whether the malware is present, and wherein the clean image comprises an operating system for the first server and malware detecting instructions to perform the determining of whether the malware is present.

* * * * *